United States Patent [19]

Håkansson

[11] Patent Number: 4,640,550

[45] Date of Patent: Feb. 3, 1987

[54] ADJUSTABLE FASTENING DEVICE

[76] Inventor: Bengt E. W. Håkansson, Ekgatan 8, S-662 00 Åmål, Sweden

[21] Appl. No.: 785,469

[22] Filed: Oct. 8, 1985

[30] Foreign Application Priority Data

Nov. 21, 1984 [SE] Sweden .................. 8405851

[51] Int. Cl.[4] .................................. B60R 22/20
[52] U.S. Cl. .............................. 297/483; 297/468; 280/808
[58] Field of Search .................. 297/468, 483, 353; 280/801, 803, 808, 804

[56] References Cited

U.S. PATENT DOCUMENTS

| | | | |
|---|---|---|---|
| 4,221,430 | 9/1980 | Frobose | 297/353 |
| 4,466,666 | 8/1984 | Takada | 280/808 X |
| 4,508,363 | 4/1985 | Temple | 297/468 X |
| 4,550,933 | 11/1985 | Patterson | 297/468 X |
| 4,552,408 | 11/1985 | Ono | 297/468 X |
| 4,556,255 | 12/1985 | Kawai | 297/488 X |
| 4,571,001 | 2/1986 | Hakansson | 297/483 |

Primary Examiner—Kenneth J. Dorner
Assistant Examiner—Peter R. Brown
Attorney, Agent, or Firm—Murray and Whisenhunt

[57] ABSTRACT

A fastening device for a safety belt in motor vehicles comprises a guiding member to be mounted on the vehicle frame or on some other carrier in the vehicle in such a way that a clearance is created between the guiding member and the carrier and comprising also a runner, to which one end of the safety belt or corresponding organ is attached, and which may be displaced along the guiding member to be positioned in different positions, said positions being determined by a number of holes (40) or recesses disposed along the guiding member. The guiding member is a channel-shaped rail (30) with a web-section (39), which faces the clearance (39) and with side flanges (32) which first project from the web-section and then turn inwards towards each other. The in-turned parts (34) form between them a longitudinal channel (35) and are provided with said recesses or holes. The runner comprises both external parts (44) outside the rail and internal parts (45) essentially inside the rail, as well as connecting means (46) there between. The connecting means extent through the longitudinal channel of the rail. The external parts include a sleeve runner (44), enclosing entirely the rail. A back portion of the sleeve runner is positioned in the clearance between the rail and its carrier (36). The sleeve runner is provided with at least two holes (50) or a corresponding larger hole (50'), thus positioned that they/it may be placed above the holes or recesses of the rail. The internal parts include /a/ locking member/s/ (47, 47', 54, 65) arranged to enter simultaneously at least one of the holes or recesses in each of the two in-turned parts of the rail. The connecting means (46) comprises means to move said locking member/s/ inward and outward with respect to the said to release and engage, respectively, said locking member/s/ from and with, respectively, said recesses or hole/s/ of the rail as well as the hole/s/ of the sleeve runner positioned outside the rail.

6 Claims, 10 Drawing Figures

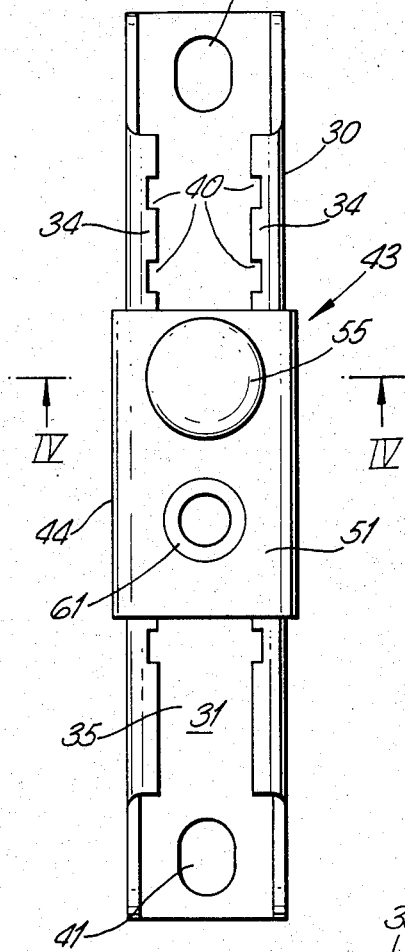
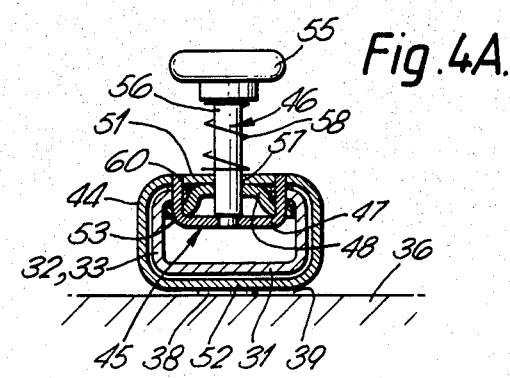
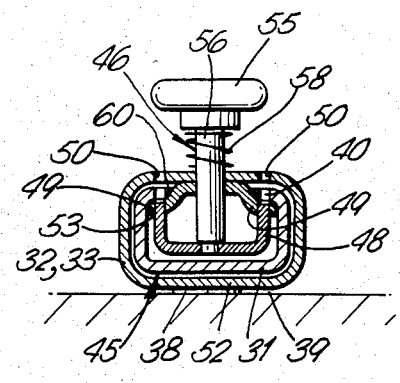
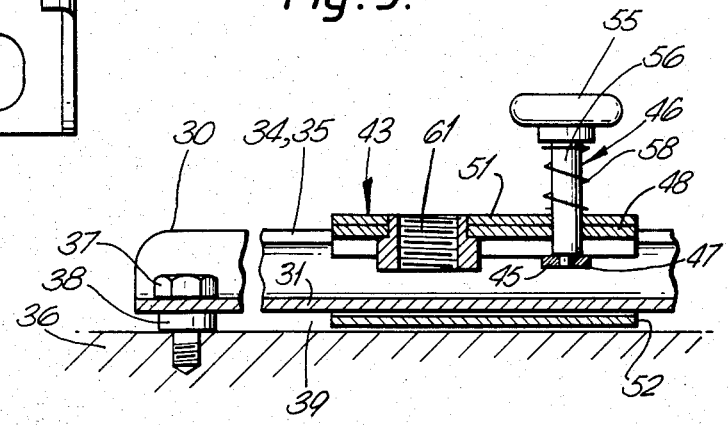

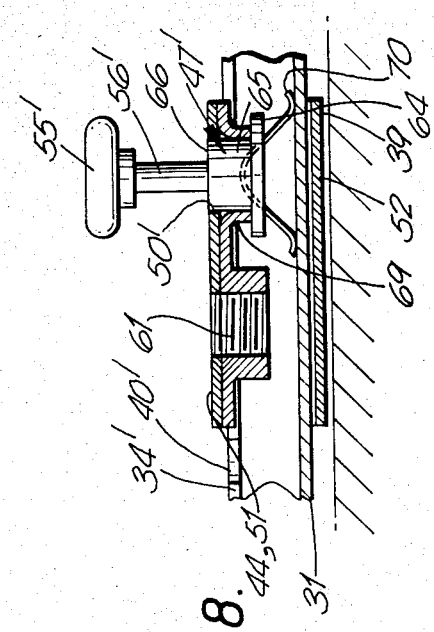
Fig. 8.
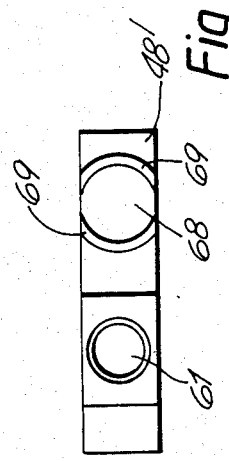
Fig. 9.
Fig. 7.
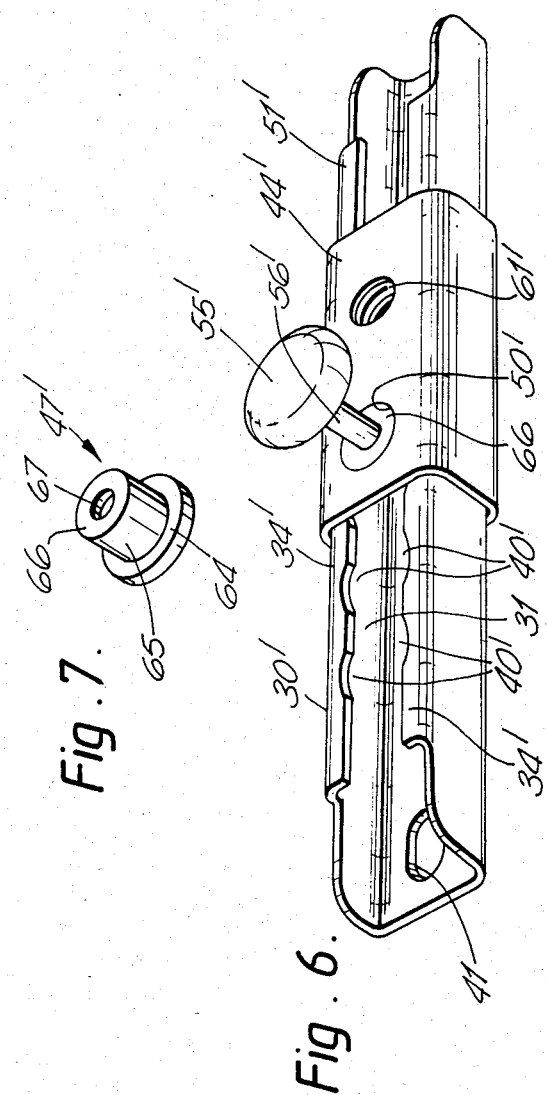
Fig. 6.

ADJUSTABLE FASTENING DEVICE

DESCRIPTION

The invention relates to an adjustable fastening device. More specifically the invention relates to a fastening device of the type comprising a guide member to be mounted on a vehicle frame or other carrier in such a way that a clearance is formed between the guide member and the carrier, and a runner which may be moved along the guide to be fixed in different positions, as determined by a number of recesses or holes dispersed along the guide. Particularly the invention relates to an adjustable fastening device to be mounted in a vehicle, for example an adjustable fastening device for safety belts or for vehicle seats.

PRIOR ART

Fastening devices for safety belts which are attached to the vehicle frame or possibly to a vehicle seat and permit the adjustment of the point of attechment vertically and longitudinally are well known. Such devices are described in the patents U.S. Pat. No. 3,526,431, DE Nos. 23 03 222, 24 12 253, 31 39 624, 32 15 980, 25 30 977 and SE No. 387,538. A fastening device of the type referred to in the preamble also is disclosed in my Swedish patent application No 8402981-8.

BRIEF DESCRIPTION OF THE INVENTION

An object of the invention is to provide an improved adjustable fastening device to be mounted on the frame of a vehicle, on a vehicle seat, or onto some other carrier, particularly in a vehicle.

In particular an object is to provide a fastening device of very low mass to meet the growing demand for low weight even of such by themselves comparatively light equipment details as safety belts and the like, which in spite of its low mass has a high tensile strength and a high resistance to deformation.

Yet another object is to provide a fastening device of a simple design, which is easy and cheap to manufacture. It is also an object to improve the design disclosed in my Swedish patent application No 8402981-8 which is referred to above. An improvement lies in that the runner can be operated by means of a push button instead of a pull button. Another improvement is that a plurality of locking points, or a locking region which distributes the locking forces over a larger area, is achieved in each locking position, which makes the locking still more safe. Still another improvement is that the fastening device easier can be provided with a rattle-damping member.

These and other objections can be achieved therein that the invention is characterized by the features of the appending claims. Further advantages with and aspects of the invention will be apparent from the following description of a preferred embodiment. The fastening device also can be modified by integrating in the construction certain features of my previous constructions disclosed in my said Swedish patent application No 8402981-8. For example the friction may be reduced by designing the section of the web of the rail such that it will be provided with a pair of longitudinal ridges turned towards the clearance, against which ridges the rear position of the runner may slide, as described in my said patent application these two ridges are preferably provided close to the two flanges of the rail, such that the space between the two ridges will represent a longitudinal elevation which is faced towards the interior of the rail, which makes the rail stiffer and improves its resistance to deformation still further. Another way of lowering the friction is to use roller bodies between the rail and the runner, in which case the rollers preferably are journalled in the runner. A third way of lowering the friction is to provide those surfaces of the runner which slide against the rail with nipples.

BRIEF DESCRIPTION OF DRAWINGS

In the following description of a pair of preferred embodiments reference will be made to the attached drawings, in which FIG. 1 is a plan elevation of a first embodiment of the invention, FIG. 3 is a section III—III in FIG. 2, FIG. 4A are sections IV—IV in FIG. 3, showing the device in locked 4B and open positions, respectively, FIG. 6 is a perspective view of a second embodiment of the fastening device according to the invention, FIG. 7 is a perspective view of a locking sleeve, being a part of this second embodiment, FIG. 8 illustrates the second embodiment in a section corresponding to that of FIG. 3, and FIG. 9 shows a guiding plate for a locking member, being a part of the second embodiment.

Figure 2:
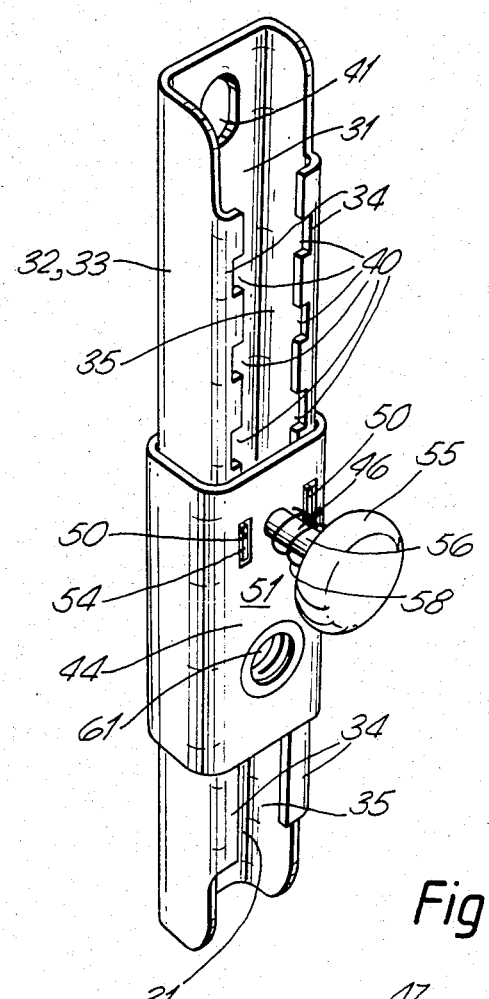
FIG. 2 is a perspective view of the same device.

In the drawings the guiding rail is generally designated by numeral 30. This rail comprises a mid-section or web 31 and two flanges 32, which first extend from the mid-section 31 with parts 33 extending outwards and then curve inwards toward each other over the mid-section 31 with parts 34, forming between them a longitudinal channel 35. The rail 30 consequently has a cross section like a shallow U-beam with in-turned flange parts 34. The rail 30 is mounted on a carrier 36, see FIG. 3, 4A and 4B, by means of screws 37. (The carrier 36 and the screws 37 are not depicted in FIG. 1 and 2.) The rail 30 is held at a distance from the carrier 36 by means of a pair of distance bushings 38, which creates a clearance 39 between the carrier 36 and the mid-section 31 of the rail 30. Further, the rail is provided with a number of evenly spaced recesses 40 in the edges of the inwardly bent flanges 34. The recesses 40 are arranged in pairs opposite each other, according to FIG. 1 and 2. Holes at both ends of the rail 30 for the screws 37 are designated by numeral 41.

A runner has generally been designated 43. It comprises an outer part, which is an entire (uninterrupted) sleeve runner 44 encasing the rail 30, inner parts inside the runner, generally designated 45, and connecting means, generally designated 46, connecting the runner to the inner parts 45. The inner parts 45 comprise a locking clamp 47, which is movable with respect to the mid-section 31 of the rail, and which is short, as measured in the longitudinal direction of the sleeve runner 44, and a center plate 48, equal in length to the sleeve runner 44, to the inside of which it is welded near the track 35. The edges 49 of the center plate 48 are turned in toward the inside of the sleeve runner and then extend outward the in-turned flanges 34 of the rail 30.

The front 51 of the sleeve runner 44, in other words that side which faces away from the backside 52 in the clearance 39, has two holes 50. These holes opposite to each other and generally of the same shape as the recesses 40 of the rail 30, are located in such a way that they may be placed exactly above the recesses 40 of the rail 30 by sliding the sleeve runner 44 along the rail. The in-turned, outwardly extending edges 49 of the center plate 48 are also provided with holes 53 corresponding to the holes 50 in the sleeve runner. Holes 50 and 53 are located exactly above each other.

Figure 5:
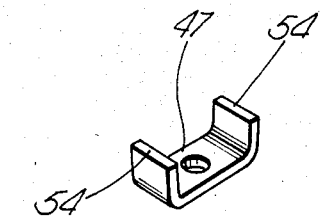
FIG. 5 is a perspective view of a locking clamp of the device, the legs of which comprise the locking member of the device.

The shape of the locking clamp 47 is apparent from FIG. 5. The locking clamp consists of a plate which has been bent to form a shallow U. The two flanges 54 have a shape and height to be able to be moved up with a close fit through the holes 53 of the center plate 48, through the recesses 40 of the rail 30, and through the holes 50 of the front side 51 of the sleeve runner 44. The legs 54 consequently form a pair of locking pins, which when in their locking positions, FIG. 4A, are level with the outside surface of the front 51 of the sleeve runner 44.

To handle the locking clamp 47 and consequently the legs/locking pins 54 there is a connecting means 46, comprising a button or knob 55 with a shaft 56 extending through a hole 57 in the front 51 of the sleeve runner 44 and through the center plate 48. The shaft 56 is by means of riveting, welding or otherwise secured to the clamp 47. A return spring is designated 58.

When the runner 43 is to be moved from one position to another, knob 55 is pressed down, causing the locking pins/leg 54 to slip out of the holes 50 of the sleeve runner 44 and the recesses 40 of the rail 30, see FIG. 4B. The locking pins/legs 54 remain in the holes 53 of the center plate 48 in this position. The runner 43 then may be moved along the rail 30, the back side 52 of the sleeve runner sliding along the back side of the runner in the clearance 39. When the desired position has been attained, the knob 55 is released and the return spring presses it upwards, the locking pins/legs 54 entering the recesses 40 of the rail 30 and the holes 50 of the front 51 of the sleeve runner. To reduce rattling made by the various parts of the device as the vehicle vibrates, a plastic border 60 is positioned on the outside of the center plate 48, between the center plate and the locking pins/legs 54.

The front of the sleeve runner is provided with yet another hole 61 for mounting one end of a safety belt or a reeling device for a safety belt or some other device intended to be secured by the fastening device.

In FIGS. 6-9, depicting a second embodiment, details of the device corresponding exactly to details in FIGS. 1-5 have been designated by the same numerals. Other details, which have a direct correspondence to but are slightly modified compared to details of the preceding embodiment having been designated by the same numerals, but with the addition of the mark'. The general outline of the device corresponds to that the preceding embodiment. As far as the general design is concerned, reference therefor is made to the foregoing description of the first embodiment. The embodiments differ in the design of the locking members. In the first embodiment the locking members comprised a clamp 47 and in this second embodiment it comprises a cylindrical locking sleeve 47', FIG. 7. More specifically, the locking member 47' consists of a cylinder 65 with a flange 64 and a closed end 66 with a hole in it, where a shaft 56' is attached by riveting. At the upper end of the shaft 56' there is a knob 55, just as in the first embodiment. The diameter of the cylinder 65 is large enough to fill, segmentwise, the pairs of opposite recesses 40', shaped as circular segments, of the in-turned edges 34' of the rail 30'. A hole 50' of a slightly larger diameter than the cylinder 65 is arranged in the front 51' of the sleeve runner 44'. Just as in the first embodiment, there is a central plate inside the sleeve runner 44' attached to the outside 51' thereof. This central plate has a hole 68 corresponding to the cylinder 65, with the edges 69 of the hole turned downwards so as to provide guiding for the cylinder 65, when the cylinder is to be pressed down by means of the knob 55 to release the cylinder 65 from its engagement with the recesses 40'. The flanges 64 serve to prevent the locking sleeve from coming loose. Below the cylinder 65 there is a return spring in the form of a spring leaf 70, which slides against the midsection 31 of the rail 30' as the sleeve runner 44' is moved along the rail 30'.

It must be appreciated, that the locking sleeve 47' need not be of a circular cylindrical form. Other possible forms include oval, rectangular, and combinations of these and other forms.

I claim:

1. Adjustable fastening device comprising a guide member mountable on a carrier so that a clearance is created between said guide member and said carrier, and a runner which may be displaced along said guide member and positioned in different positions, said positions being determined by a plurality of recesses disposed along said guide member, wherein said guide member is in the form of a rail comprising a web section, mountable adjacent said carrier and defining said clearance. and flanges extending firstly away from the web section and away from said carrier and then turning inwards toward each other, said in-turned portions between them forming a longitudinal channel, said in-turned portions each provided with said recesses; said runner comprising both external parts outside the rail, internal parts essentially inside the rail and connecting means for operably connecting said external and internal parts; said connecting means extending through said longitudinal channel of said rail; said external parts including a sleeve runner, having a front portion and a back portion, enclosing entirely the rail, said back portion of said sleeve runner being positioned in said clearance between said rail and said carrier, said front portion of said sleeve runner provided with first means defining an aperture positioned such that said first aperture means may be placed above said recesses as of said rail; said internal parts include locking means, being arranged to enter simultaneously at least one of said recesses in each of said in-turned portions of said rail, for locking said runner in a predetermined position on said rail; and said connecting means includes movement means to move said locking means inward and outward to release and engage, respectively, said locking means from and with respectively, said recesses of said rail as well as said first aperture means of the sleeve runner positioned outside said rail;

and wherein said internal parts further comprise an interconnected member arranged within said channel of said rail, said interconnected member being rigidly connected to said front portion of said sleeve runner, said interconnected member having opposed edges extending, respectively, beneath said in-turned portions of said rail and said interconnected member is provided with second means defining an aperture, receivable of said locking means, aligned with said first means defining an aperture of said sleeve runner; and said connecting means comprises a shaft, having a first end and a second end, connected to said locking means at said first end and to a push button at said second end, said push button being manually engageable to move said shaft, said shaft slidably extending through a first hole in said front portion of said sleeve runner and a second hole in said interconnected member.

2. Fastening device according to claim 1, wherein a cross-section of said sleeve runner in a plane perpendicular to the longitudinal extension of the rails is generally rectangular.

3. Fastening device according to claim 1, wherein said internal parts generally comprise a U-shaped member, the mid-section of which extends generally from the inside of the one outwardly directed side part of the rail to the inside of the other outwardly directed side part of the rail and the active parts of said locking means comprise the legs of said U-shaped clamp, extending from the mid-section of the clamp in the form of locking pins slidably receivable in said first and second aperture means and respective recesses.

4. Fastening device according to claim 1, wherein said locking means comprise a locking sleeve connected to said connecting means, said locking sleeve being slidably receivable in said first and second aperture means and respective recesses.

5. Fastening device according to claim 4, wherein said second aperture means further comprises a guide bushing for said locking sleeve.

6. Fastening device according to claim 1, wherein a rattle-damping means, including an elastic damping member, is interposed between said locking means and said sleeve runner.

* * * * *